United States Patent
Otake

(10) Patent No.: US 10,589,743 B2
(45) Date of Patent: Mar. 17, 2020

(54) VEHICLE TRAVEL CONTROL APPARATUS

(71) Applicant: TOYOTA JIDOSHA KABUSHIKI KAISHA, Toyota-shi (JP)

(72) Inventor: Hirotada Otake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 92 days.

(21) Appl. No.: 15/647,699

(22) Filed: Jul. 12, 2017

(65) Prior Publication Data

US 2018/0037230 A1 Feb. 8, 2018

(30) Foreign Application Priority Data

Aug. 4, 2016 (JP) .................................. 2016-153871

(51) Int. Cl.
*B60W 30/00* (2006.01)
*B60W 30/18* (2012.01)
(Continued)

(52) U.S. Cl.
CPC ...... *B60W 30/18109* (2013.01); *B60W 10/06* (2013.01); *B60W 10/182* (2013.01); *B60W 10/20* (2013.01); *B60W 40/04* (2013.01); *B60W 40/08* (2013.01); *B60W 50/14* (2013.01); *G06K 9/00845* (2013.01); *G08G 1/166* (2013.01); *B60W 30/12* (2013.01); *B60W 30/16* (2013.01); *B60W 2040/0818* (2013.01);
(Continued)

(58) Field of Classification Search
CPC .................................................. B60W 30/12
See application file for complete search history.

(56) References Cited

U.S. PATENT DOCUMENTS 8,346,426 B1 * 1/2013 Szybalski ............. B60W 50/14
 701/28
9,056,395 B1 * 6/2015 Ferguson ........... G08G 1/09623
(Continued)

FOREIGN PATENT DOCUMENTS

DE 10 2009 016 936 A1 11/2009
DE 10 2012 001 312 A1 8/2012
(Continued)

OTHER PUBLICATIONS

Extended European Search Report dated Dec. 21, 2017 in Patent Application No. 17179244.3, 6 pages.
(Continued)

*Primary Examiner* — Truc M Do
(74) *Attorney, Agent, or Firm* — Oblon, McClelland, Maier & Neustadt, L.L.P.

(57) ABSTRACT

A vehicle travel control apparatus includes an anomaly monitoring section for determining, through monitoring, whether or not a driver is in an anomalous state in which the driver has lost his or her ability to drive the vehicle, and a deceleration section for automatically stopping the vehicle by decelerating the vehicle after a final anomaly determined time which is a point in time when the anomaly monitoring section finally determines that the driver is in the anomalous state. The deceleration section prohibits deceleration of the vehicle in the case where the deceleration section determines that the vehicle is present in the deceleration prohibited section after the final anomaly determination time.

13 Claims, 10 Drawing Sheets

(51) Int. Cl.
*G08G 1/16* (2006.01)
*G06K 9/00* (2006.01)
*B60W 10/06* (2006.01)
*B60W 10/18* (2012.01)
*B60W 10/20* (2006.01)
*B60W 40/04* (2006.01)
*B60W 40/08* (2012.01)
*B60W 50/14* (2020.01)
*B60W 30/12* (2020.01)
*B60W 30/16* (2020.01)
*B62D 5/04* (2006.01)

(52) U.S. Cl.
CPC . *B60W 2050/143* (2013.01); *B60W 2050/146* (2013.01); *B60W 2420/42* (2013.01); *B60W 2420/52* (2013.01); *B60W 2510/18* (2013.01); *B60W 2510/202* (2013.01); *B60W 2520/14* (2013.01); *B60W 2540/10* (2013.01); *B60W 2540/12* (2013.01); *B60W 2540/26* (2013.01); *B60W 2550/22* (2013.01); *B60W 2710/18* (2013.01); *B60W 2710/202* (2013.01); *B60W 2710/207* (2013.01); *B60W 2720/14* (2013.01); *B62D 5/0463* (2013.01)

(56) References Cited

U.S. PATENT DOCUMENTS

| | | | | |
|---|---|---|---|---|
| 9,604,609 | B2* | 3/2017 | Elwart | B60T 8/17557 |
| 9,902,395 | B2* | 2/2018 | Miura | B60W 30/08 |
| 9,944,294 | B2* | 4/2018 | Takaso | B60W 10/18 |
| 10,166,997 | B2* | 1/2019 | Oba | B60W 50/082 |
| 2009/0174577 | A1 | 7/2009 | Nakamura et al. | |
| 2010/0231718 | A1 | 9/2010 | Nakamori et al. | |
| 2013/0018549 | A1* | 1/2013 | Kobana | B60K 28/06 701/41 |
| 2013/0208945 | A1 | 8/2013 | Nunn et al. | |
| 2015/0154458 | A1* | 6/2015 | Lee | G06K 9/00798 348/118 |
| 2015/0345961 | A1* | 12/2015 | Oooka | B60W 30/143 701/25 |
| 2016/0001781 | A1* | 1/2016 | Fung | B60W 40/08 701/36 |
| 2016/0132054 | A1* | 5/2016 | Eigel | B60W 50/14 701/23 |
| 2017/0232973 | A1 | 8/2017 | Otake | |
| 2018/0001893 | A1* | 1/2018 | Wei | B60W 30/09 |

FOREIGN PATENT DOCUMENTS

| | | |
|---|---|---|
| EP | 2 065 835 A2 | 6/2009 |
| EP | 2 065 835 A3 | 6/2009 |
| EP | 2 629 243 A1 | 8/2013 |
| JP | 2004-102827 A | 4/2004 |
| JP | 2008-195402 | 8/2008 |
| JP | 2009-190464 | 8/2009 |
| JP | 4349210 | 10/2009 |
| JP | 2010-6279 | 1/2010 |
| JP | 2010-211701 A | 9/2010 |
| JP | 2013-152700 | 8/2013 |
| JP | 5316706 B2 | 10/2013 |
| JP | 2014-91380 A | 5/2014 |
| JP | 2015-54547 | 3/2015 |
| JP | 2015-85887 A | 5/2015 |
| JP | 2016-16762 A | 2/2016 |

OTHER PUBLICATIONS

European Office Action dated May 16, 2019 in Patent Application No. 17 179 244.3, 4 pages.

* cited by examiner

VEHICLE TRAVEL CONTROL APPARATUS

BACKGROUND OF THE INVENTION

Field of the Invention

The present invention relates to a vehicle travel control apparatus which decelerates and (automatically) stops a vehicle when a driver of the vehicle has fallen into an anomalous state in which the driver has lost his/her ability to drive the vehicle.

Description of the Related Art

Conventionally, there has been proposed an apparatus which determines whether or not a driver of a vehicle has fallen into an anomalous state in which the driver has lost his/her ability to drive the vehicle (for example, a state in which the driver has fallen asleep while driving or a state in which the mental and bodily functions of the driver have stopped), and automatically stops the vehicle, irrespective of whether or not the brake is operated, when the apparatus determines that the driver has fallen into the anomalous state (see, for example, Japanese Patent Application Laid-Open (kokai) No. 2015-54547).

Hereinafter, such a vehicle which is automatically stopped will also be referred to as an "auto-stopping vehicle."

However, in the case of the conventional apparatus, the place at which the vehicle is automatically stopped is not specifically determined. Therefore, the conventional apparatus may cause the auto-stopping vehicle to stop at a place where an ordinance prohibits parking or stopping of vehicles, or a place where the ordinance prohibits lane changes in the lane in which the auto-stopping vehicle is travelling and therefore if the auto-stopping vehicle is actually stopped, the auto-stopping vehicle would hinder smooth traffic of other vehicles.

SUMMARY OF THE INVENTION

The present invention has been accomplished so as to solve the above-described problem. Namely, one object of the present invention is to provide a vehicle travel control apparatus (hereinafter also referred to as the "apparatus of the present invention") which decelerates and stops a vehicle when a driver of the vehicle has fallen into an anomalous state in which the driver has lost his/her ability to drive the vehicle and which can reduce the possibility of stopping the vehicle in a place where automatically stopping the vehicle is inappropriate from the viewpoint of an ordinance.

The apparatus of the present invention is a vehicle travel control apparatus which is applied to a vehicle. The vehicle travel control apparatus comprises anomaly monitoring means (10, step 230, step 320) for determining, through monitoring, whether or not a driver of the vehicle is in an anomalous state in which the driver has lost his or her ability to drive the vehicle; and deceleration means (10, 30, 31, 40, 41, step 550) for automatically stopping the vehicle by decelerating the vehicle after a final anomaly determined time which is a point in time when the anomaly monitoring means finally determines that the driver is in the anomalous state. The deceleration means determines whether or not the vehicle is present in a deceleration prohibited section determined on the basis of places where automatically stopping the vehicle is inappropriate from the viewpoint of an ordinance (step 540, step 610), through use of at least either of division line information regarding division lines on left and right sides of a travel path of the vehicle and road information regarding the travel path of the vehicle. The division line information is recognized from road image data from an image capturing apparatus (17b) when the vehicle includes the image capturing apparatus. The road information is obtained from a navigation apparatus (100, 101, 102) when the vehicle includes the navigation apparatus. The deceleration means does not decelerate the vehicle (step 545) in the case where the deceleration means determines that the vehicle is present in the deceleration prohibited section after the final anomaly determined time (the "No" determination in step 540).

In the vehicle travel control apparatus, the deceleration means stops the vehicle by decreasing the speed of the vehicle to zero after the anomaly determined time which is a point in time when the anomaly monitoring means determines that the driver is in the anomalous state. In this case, the vehicle is not decelerated (deceleration of the vehicle is prohibited) when the deceleration means determines that the vehicle is present in the deceleration prohibited section determined on the basis of the places where automatically stopping the vehicle is inappropriate from the viewpoint of the ordinance. As a result, it is possible to decrease the possibility that the vehicle is stopped in the places where automatically stopping the vehicle is inappropriate.

In one mode of the apparatus of the present invention, the deceleration means starts deceleration of the vehicle from a provisional anomaly determined time which is a point in time which is before the final anomaly determined time and at which the monitoring means determines that the driver is highly likely to be in the anomalous state (step 440), and the deceleration means does not decelerate (step 450) the vehicle in the case where the deceleration means determines that the vehicle is present in the deceleration prohibited section after the provisional anomaly determined time (the "No" determination in step 430).

In this mode, the vehicle is not decelerated (deceleration of the vehicle is prohibited) when the deceleration means determines, after the provisional anomaly determined time, that the vehicle is present in the deceleration prohibited section determined on the basis of the places where automatically stopping the vehicle is inappropriate from the viewpoint of the ordinance. As a result, it is possible to further decrease the possibility that the vehicle is stopped in the places where automatically stopping the vehicle is inappropriate from the viewpoint of the ordinance and the possibility that the vehicle travels at very low speed in such inappropriate places.

In one mode of the apparatus of the present invention, the deceleration means determines whether or not the vehicle is present in the deceleration prohibited section through use of the division line information (step 610); and the deceleration means determines that the vehicle is present in the deceleration prohibited section (the "Yes" determination in step 610) when the division line information contains none of the division lines on the left and right sides of the travel path or when both the division lines on the left and right sides of the travel path contained in the division line information end ahead of the vehicle.

In the case where the division line information contains none of the division lines on the left and right sides of the travel path or both the division lines on the left and right sides of the travel path contained in the division line information end ahead of the vehicle, it is considered that the vehicle is present at "an intersection or a railroad crossing," which is a place where automatically stopping the vehicle is inappropriate from the viewpoint of the ordinance, or immediately before the intersection or the railroad crossing. Accordingly, in the present mode, deceleration of the vehicle is prohibited when the division lines contained in the division line information are in such a state. As a result, it is possible to decrease the possibility that the vehicle is stopped at the intersection or the railroad crossing.

In one mode of the apparatus of the present invention, the deceleration means determines whether or not the vehicle is present in the deceleration prohibited section through use of the division line information (step 610); and the deceleration means determines that the vehicle is present in the deceleration prohibited section (the "Yes" determination in step 610) when an uninterrupted continuous yellow line is contained in the division lines contained in the division line information.

In the case where an uninterrupted continuous yellow line is contained in the division lines contained in the division line information, it is considered that the vehicle is present in a lane change prohibited place, which is a place where automatically stopping the vehicle is inappropriate from the viewpoint of the ordinance, or immediately before the lane change prohibited place. Accordingly, in the present mode, deceleration of the vehicle is prohibited when the division lines contained in the division line information are in such a state. As a result, it is possible to decrease the possibility that the vehicle is stopped in the lane change prohibited place.

In one mode of the apparatus of the present invention, the deceleration means determines whether or not the vehicle is present in the deceleration prohibited section through use of the division line information (step 610); and the deceleration means determines that the vehicle is present in the deceleration prohibited section (the "Yes" determination in step 610) when each of the division lines on the left and right sides of the travel path contained in the division line information is an uninterrupted continuous white line.

In the case where each of the division lines on the left and right sides of the travel path contained in the division line information is an uninterrupted continuous white line, it is considered that the vehicle is present in a lane change prohibited place, which is a place where automatically stopping the vehicle is inappropriate from the viewpoint of the ordinance, or immediately before the lane change prohibited place. Accordingly, in the present mode, deceleration of the vehicle is prohibited when the division lines contained in the division line information are in such a state. As a result, it is possible to decrease the possibility that the vehicle is stopped in the lane change prohibited place.

In one mode of the apparatus of the present invention, the deceleration means determines whether or not the vehicle is present in the deceleration prohibited section through use of the division line information (step 610); and the deceleration means determines that the vehicle is present in the deceleration prohibited section (the "Yes" determination in step 610) when the division line information contains only one of the division lines on the left and right sides of the travel path of the vehicle.

In the case where the division line information contains only one of the division lines on the left and right sides of the travel path of the vehicle, it is considered that the vehicle is present at "a T-intersection or a merging point," which is a place where automatically stopping the vehicle is inappropriate from the viewpoint of the ordinance, or immediately before the T-intersection or the merging point. Accordingly, in the present mode, deceleration of the vehicle is prohibited when the division lines contained in the division line information are in such a state. As a result, it is possible to decrease the possibility that the vehicle is stopped at "the T-intersection or the merging point."

In one mode of the apparatus of the present invention, the deceleration means determines whether or not the vehicle is present in the deceleration prohibited section through use of the division line information; and the deceleration means determines that the vehicle is present in the deceleration prohibited section when each of the division lines on the left and right sides of the travel path contained in the division line information is a composite line including an uninterrupted continuous white line and a white line interrupted at constant intervals.

In the case where each of the division lines on the left and right sides of the travel path contained in the division line information is a composite line including an uninterrupted continuous white line and a white line interrupted at constant intervals, it is considered that the vehicle is present in "a place where careful driving is necessary," which is a place where automatically stopping the vehicle is inappropriate from the viewpoint of the ordinance, or immediately before the place where careful driving is necessary. Accordingly, in the present mode, deceleration of the vehicle is prohibited when the division lines contained in the division line information are in such a state. As a result, it is possible to decrease the possibility that the vehicle is stopped at "the place where careful driving is necessary."

In one mode of the apparatus of the present invention, the deceleration means determines whether or not the vehicle is present in the deceleration prohibited section through use of the division line information; and in the case where the vehicle is travelling on a road within a country which has an ordinance which requires the vehicle to keep to the left, the deceleration means determines that the vehicle is present in the deceleration prohibited section when the left side division line contained in the division line information is a white line interrupted at constant intervals and the right side division line contained in the division line information is an uninterrupted continuous white line.

In the case where the vehicle is travelling on a road within a country which has an ordinance which requires the vehicle to keep to the left and where the right side division line contained in the division line information is an uninterrupted continuous white line and the left side division line contained in the division line information is a white line interrupted at constant intervals, it is considered that the vehicle is present in "a passing lane," which is a place where automatically stopping the vehicle is inappropriate from the viewpoint of the ordinance, or the vehicle is immediately before entering the passing lane. Accordingly, in the present mode, deceleration of the vehicle is prohibited when the division lines contained in the division line information are in such a state. As a result, it is possible to decrease the possibility that the vehicle is stopped in "the passing lane."

In one mode of the apparatus of the present invention, the deceleration means determines whether or not the vehicle is present in the deceleration prohibited section through use of the division line information; and in the case where the vehicle is travelling on a road within a country which has an ordinance which requires the vehicle to keep to the right, the deceleration means determines that the vehicle is present in the deceleration prohibited section when the right side division line contained in the division line information is a white line interrupted at constant intervals and the left side division line contained in the division line information is an uninterrupted continuous white line.

In the case where the vehicle is travelling on a road within a country which has an ordinance which requires the vehicle to keep to the right and where the right side division line contained in the division line information is a white line interrupted at constant intervals and the left side division line contained in the division line information is an uninterrupted continuous white line, it is considered that the vehicle is present in "a passing lane," which is a place where automatically stopping the vehicle is inappropriate from the viewpoint of the ordinance, or the vehicle is immediately before entering the passing lane. Accordingly, in the present mode, deceleration of the vehicle is prohibited when the division lines contained in the division line information are in such a state. As a result, it is possible to decrease the possibility that the vehicle is stopped in "the passing lane."

In one mode of the apparatus of the present invention, the deceleration means determines whether or not the vehicle is present in the deceleration prohibited section through use of the road information (step 610); and the deceleration means determines that the vehicle is present in the deceleration prohibited section (the "Yes" determination in step 610) when the road information shows that the place of the vehicle is at least one of an intersection, a railroad crossing, a lane change prohibited point, a merging point, a T-intersection, a place where an indication installed on the basis of an installation guideline of a governmental organization calls drivers' attention to a state of roads or characteristics of traffic and in which careful driving is necessary, and a passing lane.

In the present mode, in the case where the road information shows that the place of the vehicle is at least one of an intersection, a railroad crossing, a lane change prohibited point, a merging point, a T-intersection, a place where an indication installed on the basis of an installation guideline of a governmental organization calls drivers' attention to a state of roads or characteristics of traffic and in which careful driving is necessary, and a passing lane, the deceleration means determines that the vehicle is present in the deceleration prohibited section determined on the basis of the places where automatically stopping the vehicle is inappropriate from the viewpoint of the ordinance. Thus, deceleration of the vehicle is prohibited in the deceleration prohibited section. As a result, it is possible to decrease the possibility that the vehicle is stopped at least one of an intersection, a railroad crossing, a lane change prohibited point, a merging point, a T-intersection, a place where an indication installed on the basis of an installation guideline of a governmental organization calls drivers' attention to a state of roads or characteristics of traffic and in which careful driving is necessary, and a passing lane, which are the places where automatically stopping the vehicle is inappropriate from the viewpoint of the ordinance.

Notably, in the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE PREFERRED EMBODIMENT

A vehicle travel control apparatus (driving support apparatus) according to an embodiment of the present invention will be described in detail with reference to the drawings.
<Embodiment>
(Configuration)

Figure 1:
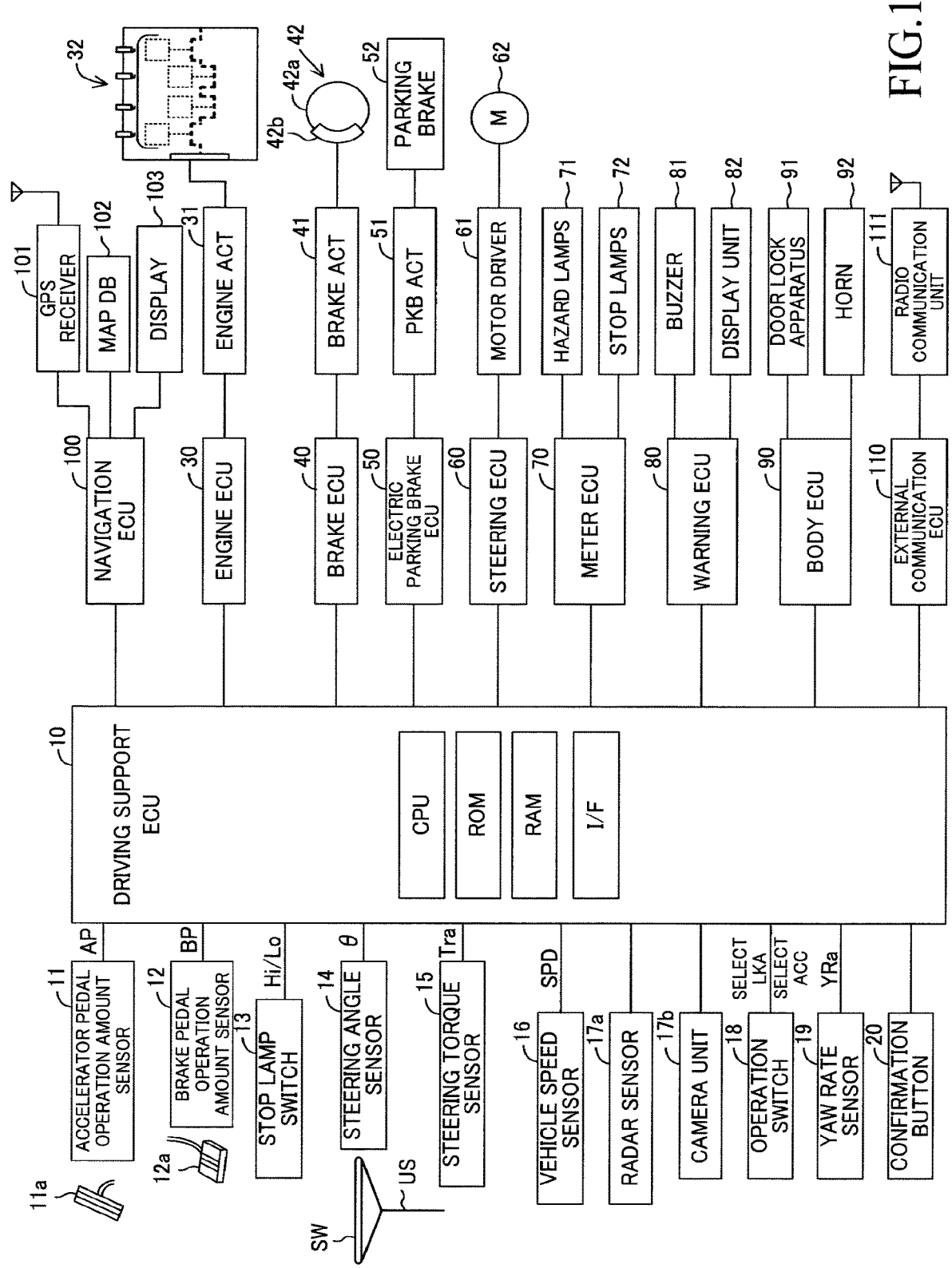
FIG. 1 is a schematic diagram of a vehicle travel control apparatus according to an embodiment of the present invention.

As shown in FIG. 1, the vehicle travel control apparatus according to the embodiment of the present invention is applied to a vehicle (in the following description, the vehicle may be referred to as the "own vehicle" so as to distinguish the vehicle from other vehicles). The vehicle travel control apparatus includes a driving support ECU 10, an engine ECU 30, a brake ECU 40, an electric parking brake ECU 50, a steering ECU 60, a meter ECU 70, a warning ECU 80, a body ECU 90, a navigation ECU 100, and an external communication ECU 110.

These ECUs are electric control units each of which includes a microcomputer as a main component, and are connected together through an unillustrated CAN (controller area network) such that the ECUs can send and receive pieces of information to and from one another. In the present specification, the microcomputer includes a CPU, a ROM, a RAM, a nonvolatile memory, an interface, etc. The CPU realizes various functions by executing instructions (programs, routines) stored in the ROM. Some or all of the ECUs may be integrated into a single ECU.

The driving support ECU 10 is connected to sensors (including switches) listed below and receives detection signals or output signals from these sensors. Notably, each sensor may be connected to an ECU other than the driving support ECU 10. In such a case, the driving support ECU 10 receives, through the CAN, the detection signal or output signal of that sensor from the ECU to which that sensor is connected.

An accelerator pedal operation amount sensor 11 is configured to detect the operation amount of an accelerator pedal 11a (accelerator opening) of the own vehicle and output a signal representing the accelerator pedal operation amount AP.

A brake pedal operation amount sensor 12 is configured to detect the operation amount of a brake pedal 12a of the own vehicle and output a signal representing the brake pedal operation amount BP.

A stop lamp switch 13 is configured to output a low-level signal when the brake pedal 12a is not depressed (is not operated) and output a high-level signal when the brake pedal 12a is depressed (is operated).

A steering angle sensor 14 is configured to detect the steering angle of the own vehicle and output a signal representing the steering angle θ.

A steering torque sensor 15 is configured to detect the steering torque applied to a steering shaft US of the own vehicle as a result of operation of a steering wheel SW and output a signal representing the steering torque Tra.

A vehicle speed sensor 16 is configured to detect the travel speed (vehicle speed) of the own vehicle and output a signal representing the vehicle speed SPD.

A radar sensor 17a is configured to obtain information regarding a road ahead of the own vehicle and information regarding three-dimensional objects present on the road. Examples of the three-dimensional objects include moving objects such as pedestrians, bicycles, and automobiles, as well as stationary objects such as utility poles, trees, and guard rails. In the following description, these three-dimensional objects may be referred to as "targets."

The radar sensor 17a includes a radar transmission/reception section and a signal processing section, both of which are not shown.

The radar transmission/reception section radiates a radio wave in the millimeter wave band (hereinafter referred to as "millimeter wave") to a region around the own vehicle, including a region located ahead of the own vehicle. The radar transmission/reception section receives a millimeter wave reflected by targets present in the radiation range (i.e., reflection wave).

Every time a predetermined time elapses, the signal processing section obtains various physical quantities regarding each detected target on the basis of the phase difference between the transmitted millimeter wave and the received reflection wave, the level of attenuation of the reflection wave, the time between transmission of the millimeter wave and reception of the reflection wave, etc. Examples of the physical quantities include the distance (longitudinal distance) between the own vehicle and the detected target, the relative speed (relative longitudinal speed) of the detected target, the lateral distance between the own vehicle and the detected target, and the relative lateral speed of the detected target.

A camera unit 17b includes a stereo camera and an image processing section, both of which are not shown. The camera unit 17b is also referred to as an image capturing apparatus.

The stereo camera captures images of scenes in left side and right side regions of an area in front of the vehicle (e.g., an area extending forward from the front end of the vehicle by about several to 50 meters) and obtains data of paired left and right images (hereinafter simply referred to as the "image data").

On the basis of the image data output from the stereo camera, the image processing section determines whether or not a target is present, computes the relative relation between the own vehicle and the target, and outputs the results of the determination and the computation.

Further, the image processing section detects the number, line types, and colors of division lines on the basis of the image data and outputs the detected number, line types, and colors of the division lines.

Notably, the driving support ECU 10 is configured to determine the relative relation between the own vehicle and the target (target information) by combining the relative relation between the own vehicle and the target obtained by the radar sensor 17a and the relative relation between the own vehicle and the target obtained by the camera unit 17b.

Further, the driving support ECU 10 is configured to recognize lane markers such as division lines (white lines, yellow lines, broken lines, etc.) on the left and right sides of the road, on the basis of the image data (road image data) output from the camera unit 17b, and obtain the shape of the road (the radius of curvature representing the degree of curvature of the road), the positional relation between the road and the vehicle, etc.

Furthermore, the driving support ECU 10 is configured to obtain the number, line types, colors, etc. of the division lines recognized from the image data, on the basis of the image data output from the camera unit 17b. Through use of the number, line types, colors, etc. of the division lines, the driving support ECU 10 obtains pieces of information representing the type, etc. of the lane in which the own vehicle is travelling. Notably, in the present specification, the term "division lines" refers to lines such as white lines, yellow lines, and broken lines, which are provided along roads, or combinations of these lines. A combination of two or more division lines located close to each other will be referred to as a composite line (see the division line on the right side of FIG. 9B and the division lines of FIG. 10).

Moreover, the driving support ECU 10 is configured to obtain a piece of information representing whether or not a side wall extends along the road on the basis of the image data output from the camera unit 17b.

An operation switch 18 are switches operated by the driver. By operating the operation switch 18, the driver can start and stop execution of lane keeping control (LKA: lane keeping assist control). Further, by operating the operation switch 18, the driver can start and stop execution of follow-up inter-vehicle distance control (ACC: adaptive cruise control).

A yaw rate sensor 19 is configured to detect the yaw rate of the own vehicle and output a signal representing the actual yaw rate YRa.

A confirmation button 20 is disposed at a position where the driver can operate the confirmation button 20 and is configured to output a low-level signal when it is not operated and output a high-level signal when it is pushed.

The driving support ECU 10 is configured to execute LKA and ACC. Further, as will be described later, the driving support ECU 10 is configured to perform various types of controls so as to determine, through monitoring, whether or not the driver is in an anomalous state in which the driver has lost his/her ability to drive the vehicle and to perform proper processing when the driving support ECU 10 determines that the driver is in the anomalous state.

The engine ECU 30 is connected to an engine actuator 31. The engine actuator 31 is an actuator for changing the operation state of an internal combustion engine 32. In the present example, the internal combustion engine 32 is a gasoline-fuel injection, spark-ignition-type multicylinder engine and has a throttle valve for adjusting the amount of intake air. The engine actuator 31 includes at least a throttle valve actuator for changing the degree of opening of the throttle valve. The engine ECU 30 can change the torque generated by the internal combustion engine 32 by driving the engine actuator 31. The torque generated by the internal combustion engine 32 is transmitted to unillustrated drive wheels through an unillustrated transmission. Accordingly, the engine ECU 30 can control the drive force of the own vehicle by controlling the engine actuator 31, to thereby change the accelerating state (acceleration) of the own vehicle.

The brake ECU 40 is connected to a brake actuator 41. The brake actuator 41 is provided in a hydraulic circuit extending between an unillustrated master cylinder which pressurizes hydraulic oil by using the depressing force applied to the brake pedal and friction brake mechanisms 42 provided in front left, front right, rear left, and rear right wheels. Each of the friction brake mechanisms 42 includes a brake disc 42a fixed to a wheel and a brake caliper 42b fixed to the body of the vehicle. The brake actuator 41 adjusts the pressure of oil supplied to a wheel cylinder incorporated into the brake caliper 42b in accordance with an instruction from the brake ECU 40 and operates the wheel cylinder by using the oil pressure so as to press a brake pad against the brake disc 42a to thereby generate a frictional braking force. Accordingly, the brake ECU 40 can control the braking force of the own vehicle by controlling the brake actuator 41.

The electric parking brake ECU (hereinafter may be referred to as the "EPB ECU") 50 is connected to a parking brake actuator (hereinafter may be referred to as the "PKB actuator") 51. The PKB actuator 51 is an actuator for pressing the brake pad against the brake disc 42a. In the case where the vehicle has a drum brake, the PKB actuator 51 is an actuator for pressing a brake shoe against a drum which rotates together with a wheel. Accordingly, the EPB ECU 50 can apply a parking brake force to the wheel by using the PKB actuator 51, to thereby maintain the vehicle in a stopped state.

The steering ECU 60 is a controller of a well known electric power steering system and is connected to a motor driver 61. The motor driver 61 is connected to a steering motor 62. The steering motor 62 is built in an unillustrated "steering mechanism of the vehicle which includes a steering wheel, a steering shaft connected to the steering wheel, a steering gear mechanism, etc." The steering motor 62 generates torque by using electric power supplied from the motor driver 61. This torque makes it possible to apply steering assist torque and to turn the left and right steerable wheels of the vehicle.

The meter ECU 70 is connected to an unillustrated digital-display-type meter and is also connected to hazard lamps 71 and stop lamps 72. The meter ECU 70 can blink the hazard lamps 71 and turn on the stop lamps 72 in accordance with instructions from the driving support ECU 10.

The warning ECU 80 is connected to a buzzer 81 and a display unit 82. In accordance with instructions from the driving support ECU 10, the warning ECU 80 can sound the buzzer 81 so as to call the driver's attention, and can turn on a mark (e.g., a warning lamp) for calling the driver's attention on the display unit 82, display a warning message on the display unit 82, and/or display the operation state of the driving support control on the display unit 82.

The body ECU 90 is connected to a door lock apparatus 91 and a horn 92. The body ECU 90 can release the door lock apparatus 91 in accordance with an instruction from the driving support ECU 10. Also, the body ECU 90 can sound the horn 92 in accordance with an instruction from the driving support ECU 10.

The navigation ECU 100 is connected to a GPS receiver 101 which receives GPS signals for detecting the present position of the own vehicle, a map database 102 which stores map information or the like, a touch-panel-type display 103 which is a human-machine interface, etc. The navigation ECU 100 determines the position of the own vehicle at the present point in time on the basis of the GPS signals (in the case where the own vehicle is travelling in one of a plurality of lanes, a piece of information representing the position includes a piece of information for determining the lane in which the vehicle is travelling). The navigation ECU 100 performs various types of computation processing on the basis of the position of the own vehicle and the map information or the like stored in the map database 102 and performs route guidance by using the display 103.

Road information is contained in the map information stored in the map database 102. The road information includes information representing intersections, information representing railroad crossings, information representing lane change prohibited points, information representing merging points, information representing T-intersections, and information representing passing lanes. Further, the road information includes the curvature radius or curvature of the road which represents the degree of curvature of the road, etc. Notably, the curvature is the reciprocal of the curvature radius.

The external communication ECU 110 is connected to a radio communication unit 111. The external communication ECU 110 and the radio communication unit 111 are radio communication terminals for connection to an external network system.

<Outline of Operation>

Next, the outline of operation of the driving support ECU 10 will be described. When a driver is driving the vehicle, the driving support ECU 10 repeatedly determines, through monitoring, whether or not "the driver is in an anomalous state in which the driver has lost his/her ability to drive the vehicle (hereinafter, simply referred to as the "anomalous state")." The driving support ECU 10 categorizes the state of the driver at the present point in time into three stages: i.e., a "normal state," a "provisional anomalous state," and a "final anomalous state" and performs processing suitable for each stage.

More specifically, in the case where a situation in which it can be considered that no driving operation is performed continues for a provisional anomaly deciding time $t1_{ref}$ in the state in which the driving support ECU 10 determines that the driver is in the normal state, the driving support ECU 10 determines that the possibility that the driver is in the anomalous state has increased. Namely, the driving support ECU 10 determines that the driver fallen into a provisional anomalous state. The situation in which it can be considered that no driving operation is performed is one of situations which occur when the driver is in the anomalous state and is also referred to as a "no-driving-operation state." The no-driving-operation state is a state which satisfies all the following conditions 1 through 3.

(Condition 1) The steering torque Tra detected by the steering torque sensor 15 is "0."

(Condition 2) The accelerator pedal operation amount AP detected by the accelerator pedal operation amount sensor 11 does not change.
(Condition 3) The brake pedal operation amount BP detected by the brake pedal operation amount sensor 12 does not change.

In the case where the driving support ECU 10 determines that the state of the driver is the "provisional anomalous state" (namely, in the case where the driving support ECU 10 performs a "provisional anomaly determination"), the driving support ECU 10 provides a warning so as to prompt the driver to perform driving operation and forcedly decelerates the vehicle to a predetermined speed (final anomaly determination permission vehicle speed SPD1) at a predetermined deceleration (first deceleration $\alpha 1$).

Further, in the case where the lane keeping control (LKA: lane keeping assist control) is not performed, the driving support ECU 10 starts the lane keeping control. The lane keeping control is control for assisting the steering operation of the driver by applying steering torque to the steering mechanism such that the position of the own vehicle is maintained near a target travel line within a "lane (travel lane) in which the own vehicle is travelling." The lane keeping control itself is known (see, for example, Japanese Patent Application Laid-Open (kokai) Nos. 2008-195402, 2009-190464, and 2010-6279, and Japanese Patent No. 4349210).

More specifically, on the basis of the image data transmitted from the camera unit 17b, the driving support ECU 10 recognizes (obtains) the "left white line LL and the right white line LR" of the lane in which the own vehicle is travelling. The driving support ECU 10 determines the central position between the two white lines as a target travel line Ld. Further, the driving support ECU 10 computes the curve radius (curvature radius) R of the target travel line Ld and the position and direction of the own vehicle in the travel lane which is delimited by the left white line LL and the right white line LR.

The driving support ECU 10 then computes the distance Dc, in the road width direction, between the target travel line Ld and the center of the front end of the own vehicle (hereinafter referred to as the "center distance Dc") and the angle $\theta y$ of deviation between the direction of the target travel line Ld and the moving direction of the own vehicle (hereinafter referred to as the "yaw angle $\theta y$").

Further, on the basis of the center distance Dc, the yaw angle $\theta y$, and the road curvature $\nu$ (=1/the curvature radius R), the driving support ECU 10 computes a target yaw rate YRc*, at predetermined computation intervals, in accordance with the following equation (1). In equation (1), K1, K2, and K3 are control gains. The target yaw rate YRc* is a yaw rate set such that the own vehicle can travel along the target travel line Ld.

$$YRc^* = K1 \times Dc + K2 \times \theta y + K3 \times \nu \quad (1)$$

On the basis of the target yaw rate YRc* and the actual yaw rate YRa, the driving support ECU 10 computes a target steering torque Tr* for obtaining the target yaw rate YRc* at the predetermined computation intervals. More specifically, a lookup table which prescribes the relation between the target steering torque Tr* and the deviation of the actual yaw rate YRa from the target yaw rate YRc* is stored in the driving support ECU 10 in advance. The driving support ECU 10 computes the target steering torque Tr* by applying the deviation of the actual yaw rate YRa (from the target yaw rate YRc*) to the table. Subsequently, the driving support ECU 10 controls the steering motor 62 through use of the steering ECU 60 such that the actual steering torque Tra coincides with the target steering torque Tr*. The above is the outline of the lane keeping control.

In the case where the driver has noticed the warning or deceleration of the vehicle and has resumed the driving operation, the driving support ECU 10 detects the driver's driving operation and determines that the state of the driver is the "normal state." In this case, the provision of the warning to the driver and the deceleration of the vehicle which have been performed are ended. Further, the setting state of the lane keeping control is returned to the original setting state.

Meanwhile, after the point (provisional anomaly determined time) at which the state of the driver was determined to be the "provisional anomalous state," warning and deceleration of the vehicle are performed. Therefore, it is considered that the driver performs some kind of driving operation unless the driver is in the anomalous state. Therefore, in the case where the state in which the driver performs no driving operation (the no-driving-operation state) further continues over a final anomaly deciding time $t2_{ref}$ after the provisional anomaly determined time, the probability that the driver is in the anomalous state is very high. In view of this, in such a case, the driving support ECU 10 determines that the driver is in the final anomalous state (namely, the driving support ECU 10 performs a "final anomaly determination") and forcedly decelerates the vehicle, from that point (final anomaly determined time), at a predetermined deceleration (second deceleration $\alpha 2$) until the vehicle stops.

Incidentally, if the own vehicle stops at an intersection, a railroad crossing, etc., smooth traffic of other vehicles or trains is hindered. In view of this, in the case where the state of the driver is determined to be the "provisional anomalous state" or the "final anomalous state," the driving support ECU 10 determines whether or not the place where the own vehicle is present is a deceleration prohibited section determined on the basis of places where "ordinance prohibits the driver from decelerating and stopping the own vehicle (hereinafter referred to as the "places where automatically stopping the vehicle is inappropriate from the viewpoint of the ordinance") (hereinafter the deceleration prohibited section determined on the basis of such places may be simply referred to as the "deceleration prohibited section"). Notably, the places where automatically stopping the vehicle is inappropriate from the viewpoint of the ordinance may be referred to as the "stoppage prohibited place." The deceleration prohibited section includes the stoppage prohibited place and a place immediately before the stoppage prohibited place.

In this case, the determination as to whether or not the place where the own vehicle is present is the deceleration prohibited section is made on the basis of "division line information regarding division lines on the left and right sides of the travel path of the own vehicle," which division lines are recognized by the driving support ECU 10 on the basis of the road image data from the camera unit 17b. The division line information includes the number, line types, colors, etc. of the division lines. Notably, this determination may be performed on the basis of the road information from the navigation ECU 100 or many be performed on the basis of a combination of the division line information and the road information obtained from the navigation ECU 100.

In the present specification, the "places where automatically stopping the vehicle is inappropriate from the viewpoint of the ordinance (stoppage prohibited places)" include places exemplified below. Notably, the ordinance means the ordinance of a nation, a state, or the like. In the case of Japan, the ordinance means the road traffic act of Japan. However, the term "ordinance" encompasses an installation guideline on signs (road signs) which is provided by a governmental organization (in Japan, the National Police Agency, etc.).

(1) Places where parking or stopping of vehicles are prohibited by the ordinance.
(2) Places in lanes where the ordinance prohibits the own vehicle from traveling in particular manners (e.g., lane change, etc.) and therefore it is expected that if the own vehicle is automatically stopped or travels at low speed in the lanes due to deceleration, the own vehicle would hinder smooth traffic of other vehicles whose drivers try to obey the ordinance.
(3) Places where signs or the like installed on the basis of the installation guideline of the governmental organization call drivers' attention to the state of roads or the characteristics of traffic.

More specifically, the places where automatically stopping the vehicle is inappropriate from the viewpoint of the ordinance include places listed below.

Intersections, Railroad Crossings, etc.

Since these are places where parking and stoppage are prohibited by the road traffic act, it is inappropriate to automatically stop the vehicle.

Lane Change Prohibited Roads

On lane change prohibited roads, if the own vehicle is automatically stopped, the drivers of vehicles following the own vehicle and obeying the ordinance (traffic rule) must brake hard so as to avoid the stopped own vehicle. Therefore, it is inappropriate to automatically stop the vehicle.

Places where signs or the like installed on the basis of the installation guideline of the governmental organization (the National Police Agency in Japan) call drivers' attention to the state of roads or the characteristics of traffic and therefore careful driving is necessary (hereinafter referred to as the "places where careful driving is necessary").

Examples of the places where careful driving is necessary include sections where there are displayed a deceleration mark such as a flow-guiding lane mark which is provided in sections where deceleration is necessary and before such sections. It is inappropriate to automatically stop the vehicle at such places where careful driving is necessary. Notably, the flow-guiding lane mark is, for example, a white broken line (i.e., a white line interrupted at constant intervals) which is provided on each of the left and right sides of the travel path of the vehicle to be located adjacent to a white or yellow line (which may be continuous without interruption or may be interrupted at constant intervals) which serves as a lane mark (see FIG. 10). Notably, a pair of lines provided adjacent to each other is also referred to as a composite line.

T-intersections

As in the case of intersections, it is inappropriate to automatically stop the vehicle because if the vehicle is stopped, smooth traffic of other vehicles is hindered.

Passing Lanes of Expressways or the Like

Stoppage of the vehicle in a passing lane of an expressway or the like may cause a state in which the drives of other vehicles must brake the vehicles hard. Therefore, it is inappropriate to automatically stop the vehicle. Notably, in a country, such as Japan, which has an ordinance which requires vehicles to keep to the left, the passing lane is a lane on the rightmost side among a plurality of lanes. In a country, such as United States, which has an ordinance which requires vehicles to keep to the right, the passing lane is a lane on the leftmost side among a plurality of lanes.

More specifically, these places are determined on the basis of the results of recognition of division lines as shown in Table 1 provided below. In the case where the results of recognition of division lines as described below are obtained, the own vehicle is highly likely to be present in a place where automatically stopping the vehicle is inappropriate from the viewpoint of the ordinance or immediately before the place, and therefore, the place where the own vehicle is present is determined to be the "deceleration prohibited section determined on the basis of the places where automatically stopping the vehicle is inappropriate from the viewpoint of the ordinance." Notably, the determination regarding the passing lane of Table 1 is effective in countries (for example, Japan) in which the ordinance requires vehicles to keep to the left.

TABLE 1

| Places where automatically stopping the vehicle is inappropriate from the viewpoint of the ordinance | Results of recognition of division lines |
| --- | --- |
| Intersection, railways crossing | Left-side and right-side division lines are absent or interrupted. |
| Lane change prohibited place | Uninterrupted continuous white lines are provided on the left and right sides. An uninterrupted continuous yellow line or a composite line including an uninterrupted continuous yellow line is provided. |
| Place where careful driving is necessary | Composite lines each including a white line interrupted at constant intervals are provided on the left and right sides. |
| T-intersection or merging point | No division line is provided on the left side or no division line is provided on the right side. |
| Passing lane | A division line on the left side is a white line interrupted at constant intervals and a division line on the right side is an uninterrupted continuous white line. |

In the case where as a result of the above-described determination, the place where the own vehicle is present is determined to be the deceleration prohibited section, deceleration at a predetermined deceleration is prohibited, which deceleration would otherwise be performed when the driver is determined to be in the provisional anomalous state or when the driver is determined to be in the final anomalous state. As a result, it is possible to decrease the possibility that the own vehicle is automatically stopped at the places where automatically stopping the vehicle is inappropriate from the viewpoint of the ordinance.

Meanwhile, in the case where as a result of the above-described determination, the place where the own vehicle is present is determined not to be the deceleration prohibited section, the deceleration at the predetermined deceleration, which is performed when the driver is determined to be in the provisional anomalous state or when the driver is determined to be in the final anomalous state, is permitted. Notably, the results of recognition of division lines, etc., for the case where the place where the own vehicle is present is determined not to be the deceleration prohibited section will be described later.

<Specific Operation>

Next, specific operation of the CPU of the driving support ECU 10 (hereinafter may be simply referred to as the "CPU"). Every time a predetermined time elapses, the CPU executes routines represented by flowcharts in FIGS. 2 through 6.

The CPU monitors the state of the driver and determines, on the basis of the result of the monitoring, the state of the driver (the "normal state," the "provisional anomalous state," or the "final anomalous state"). The CPU then changes (sets) the values of a provisional anomaly flag Xk and a final anomaly flag Xh in accordance with the determined state.

The provisional anomaly flag Xk represents that the state of the driver at the present point in time is the "provisional anomalous state" when its value is "1." The final anomaly flag Xh represents that the state of the driver at the present point in time is the "final anomalous state" when its value is "1." In the case where both the values of the provisional anomaly flag Xk and the final anomaly flag Xh are "0," it represents that the state of the driver at the present point in time is the "normal state." The values of the provisional anomaly flag Xk and the final anomaly flag Xh are set to "0" in an initial routine which is executed by the CPU when an unillustrated ignition key switch mounted on the vehicle is moved from its off position to its on position.

In the case where the ignition key switch is in the on position, the routines of FIGS. 2 through 6 are started every time a predetermined period of time elapses. In this case, since the provisional anomaly flag Xk and the final anomaly flag Xh have been initialized (Xk=0, Xh=0), in actuality, the normal-time routine functions.

First, the normal-time routine will be described with reference to FIG. 2. When a predetermined timing has come, the CPU starts the normal-time routine from step 200 and proceeds to step 210 so as to determine whether or not both the values of the provisional anomaly flag Xk and the final anomaly flag Xh are "0."

Here, it is assumed that the present point in time is immediately after the ignition key switch has been turned on. In this case, the provisional anomaly flag Xk and the final anomaly flag Xh have been initialized, and both the values of the provisional anomaly flag Xk and the final anomaly flag Xh are "0." Therefore, the CPU makes a "Yes" determination in step 210 and proceeds to step 220 so as to determine whether or not the vehicle speed SPD is equal to or greater than a provisional anomaly determination permission vehicle speed SPD0 set in advance. Notably, this provisional anomaly determination permission vehicle speed SPD0 is set to a value equal to or greater than a final anomaly determination permission vehicle speed SPD1.

In the case where the vehicle speed SPD is less than the provisional anomaly determination permission vehicle speed SPD0, the CPU makes a "No" determination in step 220 and proceeds to step 225 so as to set (clear) the value of a provisional anomaly determination timer t1 to "0." Subsequently, the CPU proceeds to step 295 so as to end the current execution of the present routine. In contrast, in the case where the vehicle speed SPD is equal to or greater than the provisional anomaly determination permission vehicle speed SPD0, the CPU makes a "Yes" determination in step 220 and proceeds to step 230 so as to determine whether or not the driver is in a state in which the driver performs no driving operation (no-driving-operation state). Notably, the no-driving-operation state is a state in which none of the above-described condition 1 through condition 3 is satisfied.

In the case where the driver is performing driving operation (namely, in the case where any of the above-described condition 1 through condition 3 is satisfied), the CPU makes a "No" determination in step 230 and proceeds to step 240 so as to set the value of the provisional anomaly determination timer t1 to "0." Subsequently, the CPU proceeds to step 295 so as to end the current execution of the present routine. In contrast, in the case where the driver performs no driving operation, the CPU makes a "Yes" determination in step 230 and proceeds to step 250 so as to increase the value of the provisional anomaly determination timer t1 by "1." The value of the provisional anomaly determination timer t1 represents a period of time over which the no-driving-operation state continues in a state in which the vehicle speed SPD is equal to or greater than the provisional anomaly determination permission vehicle speed SPD0.

Subsequently, the CPU proceeds to step 260 so as to determine whether or not the value of the provisional anomaly determination timer t1 is equal to or greater than a provisional anomaly deciding time $t1_{ref}$ set in advance. The provisional anomaly deciding time $t1_{ref}$ is set to an appropriate time within the range of, for example, 5 sec. to 30 sec.

In the case where the value of the provisional anomaly determination timer t1 is less than the provisional anomaly deciding time $t1_{ref}$, the CPU makes a "No" determination in step 260 and proceeds to step 295 so as to end the current execution of the present routine. In contrast, in the case where the value of the provisional anomaly determination timer t1 is equal to or greater than the provisional anomaly deciding time $t1_{ref}$, the CPU makes a "Yes" determination in step 260 and proceeds to step 270 so as to set the value of the provisional anomaly flag Xk to "1." Subsequently, the CPU proceeds to step 295 so as to end the current execution of the present routine.

In general, in the case where the driver is in the normal state, the possibility that the no-driving-operation state continues over the provisional anomaly deciding time $t1_{ref}$ in the state in which the vehicle speed SPD is equal to or greater than the provisional anomaly determination permission vehicle speed SPD0 is small. Accordingly, through the above-described processing, the CPU determines that the driver is highly likely to be in the anomalous state (namely, the driver is in the provisional anomalous state) when the no-driving-operation state continues over the provisional anomaly deciding time $t1_{ref}$ in the state in which the vehicle speed SPD is equal to or greater than the provisional anomaly determination permission vehicle speed SPD0.

The timing at which the value of the provisional anomaly flag Xk was set to "1" is the timing at which the driving support ECU 10 first determined that the driver is in the anomalous state in which the driver has lost his/her ability to drive the vehicle (the driving support ECU 10 provisionally determined that the driver is in the anomalous state). In the case where the provisional anomaly flag Xk was set to "1," the CPU makes a "No" determination in step 210 and proceeds to step 295 via step 225. Accordingly, in actuality, the normal-time routine of FIG. 2 is not executed, and a final anomaly determination routine which will be described later functions.

Notably, in the case where the value of the provisional anomaly flag Xk is "1," or the value of the final anomaly flag Xh is "1," the driving support ECU 10 automatically executes the lane keeping control (LKA). Namely, even in the case where execution of the lane keeping control is not selected by the operation switch 18, the driving support ECU 10 forcedly executes the lane keeping control. Accordingly, even when the driver performs no steering operation, the own vehicle can be caused to travel along the target travel line (the central position between the left and right white lines).

Further, in the case where the value of the provisional anomaly flag Xk is "1," or the value of the final anomaly flag Xh is "1," the driving support ECU 10 stops the follow-up inter-vehicle distance control (ACC) even when execution of the follow-up inter-vehicle distance control (ACC) is selected by the operation switch 18. However, in the case where the inter-vehicle distance between the own vehicle and a vehicle traveling ahead of the own vehicle is likely to become less than an allowable distance, irrespective of selection of ACC, the driving support ECU 10 controls the deceleration of the own vehicle such that the inter-vehicle distance does not become less than the allowable distance.

Figure 3:
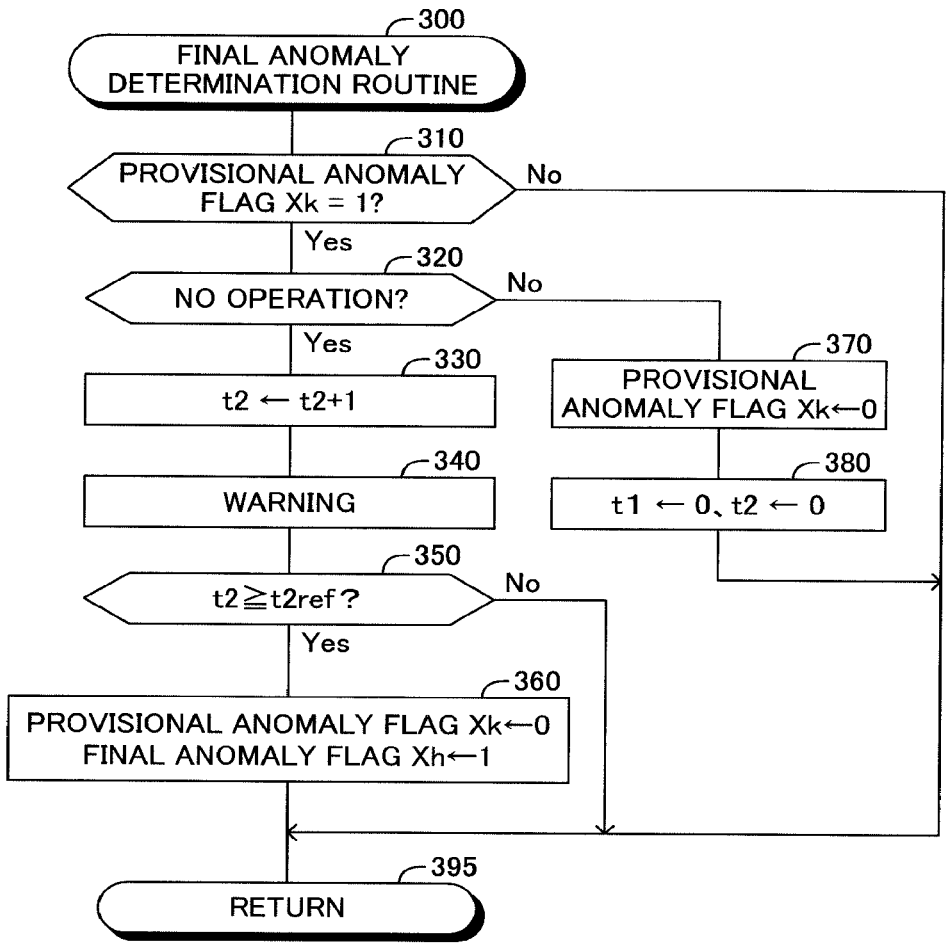
FIG. 3 is a flowchart representing a final anomaly determination routine executed by the CPU of the driving support ECU shown in FIG. 1.

Next, the final anomaly determination routine will be described with reference to FIG. 3. When a predetermined timing has come, the CPU starts the final anomaly determination routine from step 300 and proceeds to step 310 so as to determine whether or the value of the provisional anomaly flag Xk is "1."

In the case where the value of the provisional anomaly flag Xk is "0," the CPU makes a "No" determination in step 310 and proceeds to step 395 so as to end the current execution of the present routine.

In contrast, in the case where the value of the provisional anomaly flag Xk is "1," the CPU makes a "Yes" determination in step 310 and proceeds to step 320 so as to determine whether or not the driver is in a state in which the driver performs no driving operation.

In the case where the driver is performing driving operation, the CPU makes a "No" determination in step 320 and proceeds to step 370 so as to set the value of the provisional anomaly flag Xk to "0." Subsequently, the CPU proceeds to step 380 so as to set both the values of the provisional anomaly determination timer t1 and the final anomaly determination timer t2 to "0." Subsequently, the CPU proceeds to step 395 so as to end the current execution of the present routine.

In contrast, in the case where the driver performs no driving operation, the CPU makes a "Yes" determination in step 320 and proceeds to step 330 so as to increase the value of the final anomaly determination timer t2 by "1." Subsequently, the CPU proceeds to step 340 so as to provide a warning to the driver and then proceeds to step 350 so as to determine whether or not the value of the final anomaly determination timer t2 is equal to or greater than a final anomaly deciding time $t2_{ref}$ set in advance. Notably, the final anomaly deciding time $t2_{ref}$ is set to an appropriate time within the range of, for example, 20 sec. to 30 sec.

In the case where the value of the final anomaly determination timer t2 is less than the final anomaly deciding time $t2_{ref}$, the CPU makes a "No" determination in step 350 and proceeds to step 395 so as to end the current execution of the present routine. In contrast, in the case where the value of the final anomaly determination timer t2 is equal to or greater than the final anomaly deciding time $t2_{ref}$, the CPU makes a "Yes" determination in step 350 and proceeds to step 360 so as to set the value of the provisional anomaly flag Xk to "0" and set the value of the final anomaly flag Xh to "1." Subsequently, the CPU proceeds to step 395 so as to end the current execution of the present routine.

In general, in the case where the driver is in the normal state, the possibility that the no-driving-operation state continues over the final anomaly deciding time $t2_{ref}$ is small because of the above-described warning. Accordingly, through the above-described processing, the CPU determines that the driver has fallen into the anomalous state (namely, the driver is in the final anomalous state) when the no-driving-operation state continues over the final anomaly deciding time $t2_{ref}$.

Figure 4:
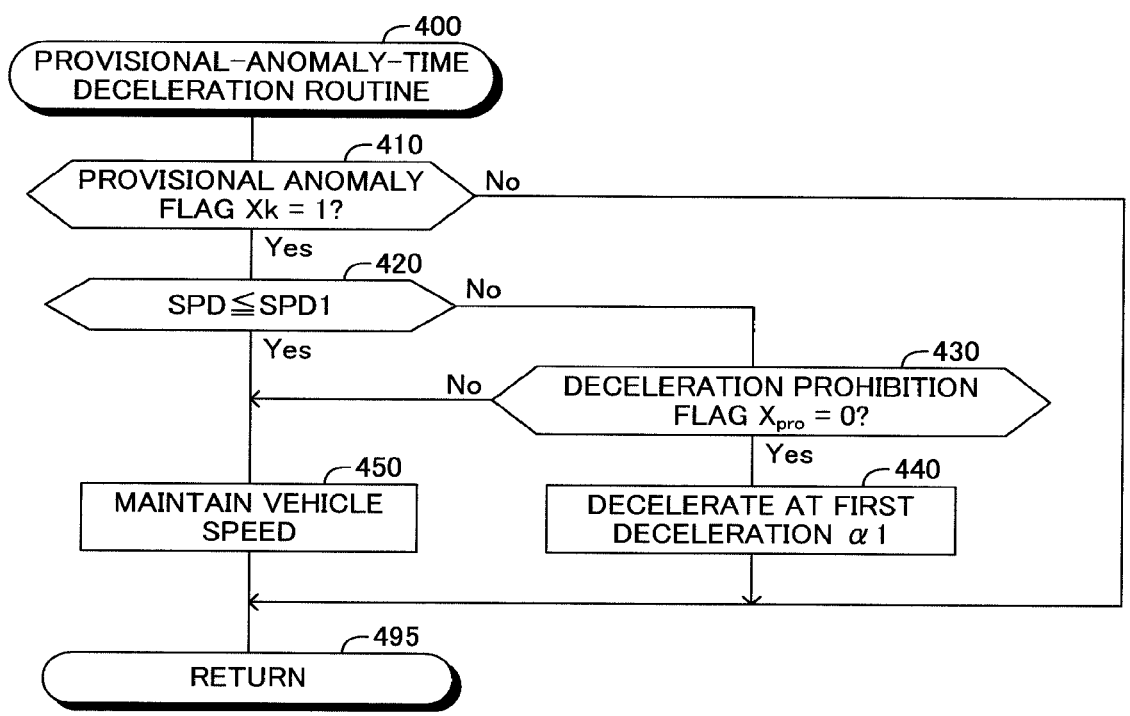
FIG. 4 is a flowchart representing a provisional-anomaly-time deceleration routine executed by the CPU of the driving support ECU shown in FIG. 1.

Next, a provisional-anomaly-time deceleration routine will be described with reference to FIG. 4. When a predetermined timing has come, the CPU starts the provisional-anomaly-time deceleration routine from step 400 and proceeds to step 410 so as to determine whether or the value of the provisional anomaly flag Xk is "1."

In the case where the value of the provisional anomaly flag Xk is not "1," the CPU makes a "No" determination in step 410 and proceeds to step 495 so as to end the current execution of the present routine. In contrast, in the case where the value of the provisional anomaly flag Xk is "1," the CPU makes a "Yes" determination in step 410 and proceeds to step 420 so as to determine whether or not the vehicle speed SPD has become equal to or less than the final anomaly determination permission vehicle speed SPD1 set in advance. Notably, the final anomaly determination permission vehicle speed SPD1 is the lower limit of the vehicle speed at the time of the provisional anomaly and is set to a value greater than 0.

In the case where the vehicle speed SPD is greater than the final anomaly determination permission vehicle speed SPD1, the CPU makes a "No" determination in step 420 and proceeds to step 430 so as to determine whether or not the value of a deceleration prohibition flag $X_{pro}$ is "0." The value of this deceleration prohibition flag $X_{pro}$ is set to "0" in the above-described initial routine and is set to "0" when the CPU determines that the own vehicle is in a place where the own vehicle is permitted to decelerate (namely, the own vehicle is not in the deceleration prohibited section). Further, the value of the deceleration prohibition flag is set to "1" when the CPU determines that the own vehicle is in a place where the own vehicle is prohibited to decelerate (namely, the own vehicle is in the deceleration prohibited section). A method of setting this deceleration prohibition flag (namely, a method of determining whether or not the own vehicle is in the place where the own vehicle is permitted to decelerate) will be described with reference to FIGS. 6 through 9 later.

In the case where the value of the deceleration prohibition flag $X_{pro}$ is "0," the CPU makes a "Yes" determination in step 430 and proceeds to step 440 so as to decelerate the own vehicle at the first deceleration α1. Subsequently, the CPU proceeds to step 495 so as to end the current execution of the present routine.

In the case where the value of the deceleration prohibition flag $X_{pro}$ is not "0" (namely, the value of the deceleration prohibition flag $X_{pro}$ is "1"), the CPU makes a "No" determination in step 430 and proceeds to step 450 so as to maintain the vehicle speed of the own vehicle at the vehicle speed at the present point in time. Subsequently, the CPU proceeds to step 495 so as to end the current execution of the present routine.

In contrast, in the case where the vehicle speed SPD is equal to or less than the final anomaly determination permission vehicle speed SPD1, the CPU makes a "Yes" determination in step 420 and proceeds to step 450 so as to maintain the vehicle speed of the own vehicle at the vehicle speed at the present point in time. Subsequently, the CPU proceeds to step 495 so as to end the current execution of the present routine. In this case, the driving support ECU 10 outputs to the engine ECU 30 and the brake ECU instruction signals for causing the own vehicle to travel at the vehicle speed SPD at the present point in time obtained on the basis of the signal from the vehicle speed sensor 16 (constant-speed travel). As a result, the travel state of the own vehicle is changed from the decelerating travel performed up to the present point to the constant-speed travel. Notably, in the case where the constant-speed travel is continued, the driving support ECU 10 preferably stores the vehicle speed detected at the time of switching from the decelerating travel to the constant-speed travel and maintains that vehicle speed. After that, the CPU proceeds to step 495 so as to end the current execution of the present routine.

The CPU repeats such processing. In the case where the own vehicle is determined to be in the deceleration prohibited section, the CPU prohibits the deceleration at a predetermined deceleration, which deceleration would otherwise be performed when the driver is determined to be in the provisional anomalous state and the vehicle speed SPD is determined to be greater than the final anomaly determination permission vehicle speed SPD1. As a result, it is possible to decrease the possibility that the own vehicle travels at low speed in a place where automatically stopping the vehicle is inappropriate from the viewpoint of the ordinance and the possibility that the own vehicle is automatically stopped in that place.

Figure 5:
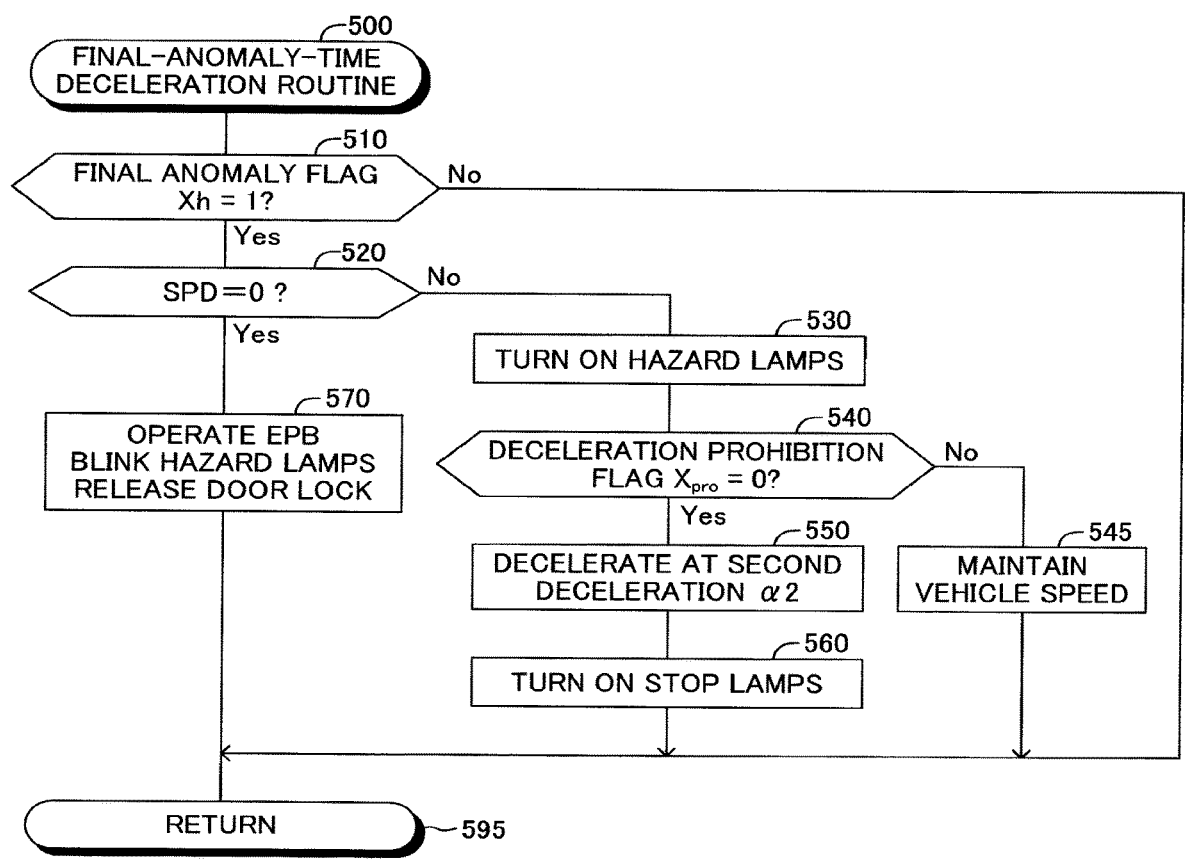
FIG. 5 is a flowchart representing a final-anomaly-time deceleration routine executed by the CPU of the driving support ECU shown in FIG. 1.

Next, a final-anomaly-time deceleration routine will be described with reference to FIG. 5. When a predetermined timing has come, the CPU starts the final-anomaly-time deceleration routine from step 500 and proceeds to step 510 so as to determine whether or the value of the final anomaly flag Xh is "1."

In the case where the value of the final anomaly flag Xh is not "1," the CPU makes a "No" determination in step 510 and proceeds to step 595 so as to end the current execution of the present routine. In contrast, in the case where the value of the final anomaly flag Xh is "1," the CPU makes a "Yes" determination in step 510 and proceeds to step 520 so as to determine, on the basis of the vehicle speed SPD, whether or not the own vehicle has stopped. Specifically, in step 520, the CPU determines whether or not the vehicle speed SPD is 0.

When this determination is first performed, the own vehicle has not yet stopped. In this case, since the vehicle speed SPD is not 0, the CPU makes a "No" determination in step 520 and proceeds to step 530 so as to output an instruction for blinking the hazard lamps 71.

Next, the CPU proceeds to step 540 so as to determine whether or not deceleration is not prohibited (deceleration is permitted). Specifically, in step 540, the CPU determines whether or not the value of the deceleration prohibition flag $X_{pro}$ is "0."

In the case where the value of the deceleration prohibition flag $X_{pro}$ is "0," the CPU makes a "Yes" determination in step 540 and proceeds to step 550 so as to decelerate the own vehicle at the constant second deceleration α2 set in advance. This second deceleration α2 is set to a value which is greater in absolute value than the first deceleration α1.

Next, the CPU proceeds to step 560 so as to output to the meter ECU 70 an instruction for turning on the stop lamps 72. Since the stop lamps 72 are turned on and the hazard lamps 71 are blinked, it is possible to call attention of the driver of a vehicle following the own vehicle. After that, the CPU proceeds to step 595 so as to end the current execution of the present routine.

In contrast, in the case where the value of the deceleration prohibition flag $X_{pro}$ is "1" (namely, deceleration of the own vehicle is prohibited) at the point when the CPU executes the processing of step 540, the CPU makes a "No" determination in step 540 and proceeds to step 545 so as to maintain the vehicle speed of the own vehicle at the vehicle speed at the present point in time. Subsequently, the CPU proceeds to step 595 so as to end the current execution of the present routine. Accordingly, in this case, since deceleration of the vehicle is not performed, the vehicle does not stop.

Incidentally, in the case where the vehicle speed SPD is 0 when the processing of the above-described step 520 is performed, the CPU makes a "Yes" determination in step 520 and proceeds to step 570 so as to apply parking brake forces to the wheels through use of the electric parking brake ECU 50. Namely, the driving support ECU 10 maintains the own vehicle in a stopped state. Further, the CPU blinks the hazard lamps 71 through use of the meter ECU 70 and unlocks the doors of the vehicle through use of an illustrated door lock ECU. The CPU then proceeds to step 595 so as to end the current execution of the present routine.

Figure 6:
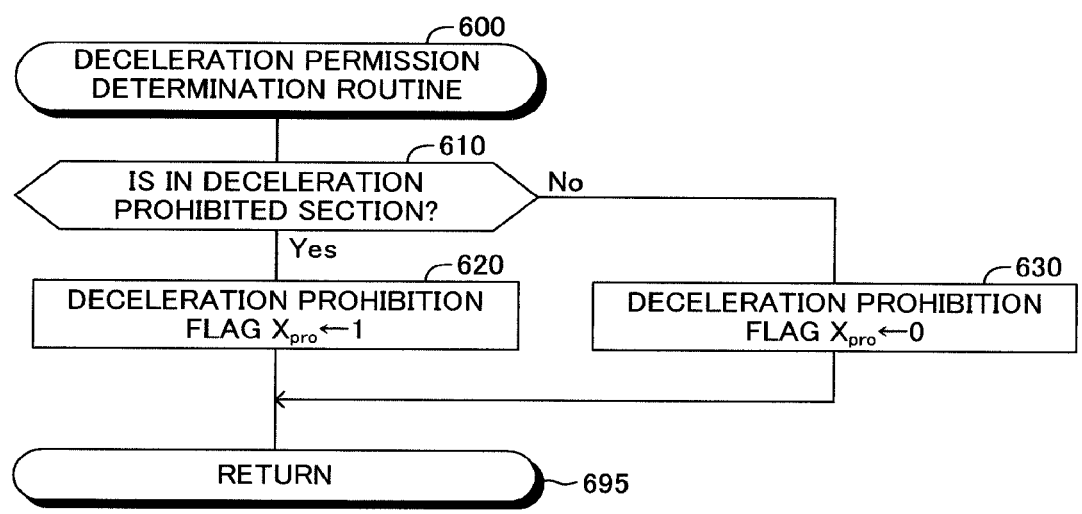
FIG. 6 is a flowchart representing a deceleration permission determination routine executed by the CPU of the driving support ECU shown in FIG. 1.

Next, a deceleration permission determination routine will be described with reference to FIG. 6. When a predetermined timing has come, the CPU starts the deceleration permission determination routine from step 600 and proceeds to step 610 so as to determine whether or the own vehicle is in the deceleration prohibited section (namely, whether or not the own vehicle is in the deceleration prohibited section determined on the basis of the stoppage prohibited places). At that time, the CPU performs the determination on the basis of the division line information extracted from the road image data output from the camera unit 17b.

Specifically, the CPU recognizes the number, line types, colors, etc. of the division lines on the left and right sides of the travel path of the own vehicle on the basis of the road image data, and determines, on the basis of the recognized number, line types, colors, etc. of the division lines, whether or not the own vehicle is present in the deceleration prohibited section when the road image data is obtained.

More specifically, on the basis of the division line information regarding the division lines on the left and right sides of the travel path of the own vehicle, which is extracted from the road image data, the CPU determines whether or not the own vehicle is highly likely to be present in a place where automatically stopping the vehicle is inappropriate from the viewpoint of the ordinance or immediately before the place when the road image data is obtained. This determination method will now be described in detail.

Figure 7:
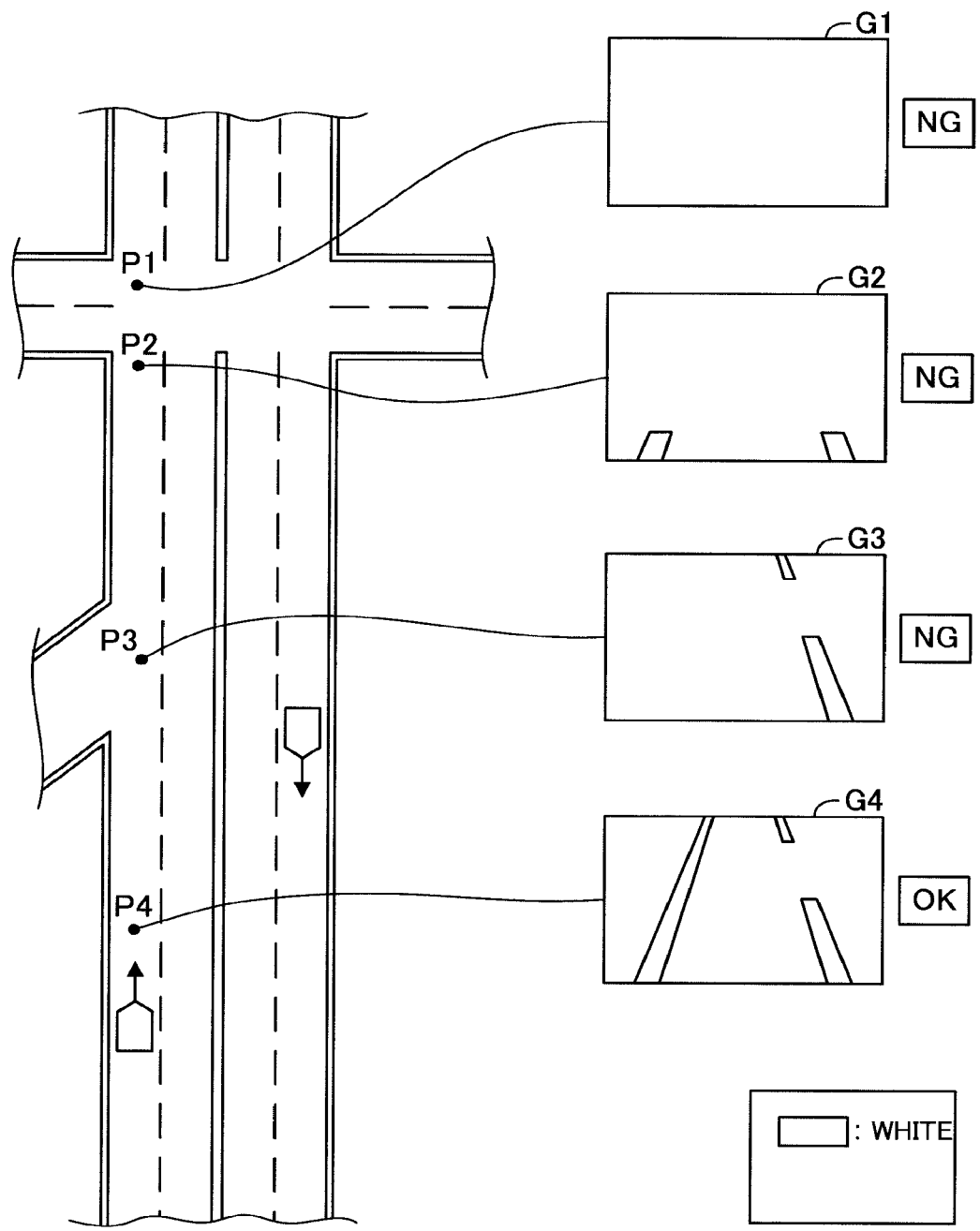
FIG. 7 is an illustration showing division line information extracted from road image data output from a camera unit of a vehicle travelling on the road.

As shown in FIG. 7, a piece of division line information extracted from road image data G1 obtained by shooting (photographing) an area including a point P1 contains none of the division lines on the left and right sides of the travel path of the own vehicle. At that time, the own vehicle is highly likely to be present in a place where automatically stopping the vehicle is inappropriate from the viewpoint of the ordinance (an intersection section) or immediately before such a place. In this case, the CPU determines that the own vehicle is in the deceleration prohibited section.

As shown in FIG. 7, a piece of division line information extracted from road image data G2 obtained by shooting an area including a point P2 contains the division lines on the left and right sides of the travel path of the own vehicle which end ahead of the own vehicle. At that time, the own vehicle is highly likely to be present in a place where automatically stopping the vehicle is inappropriate from the viewpoint of the ordinance (an intersection section) or immediately before such a place. In this case, the CPU determines that the own vehicle is in the deceleration prohibited section.

As shown in FIG. 7, a piece of division line information extracted from road image data G3 obtained by shooting an area including a point P3 contains only the division line on the right side of the travel path of the own vehicle. At that time, the own vehicle is highly likely to be present in a place where automatically stopping the vehicle is inappropriate from the viewpoint of the ordinance (a T-intersection section or a merging point) or immediately before such a place. In this case, the CPU determines that the own vehicle is in the deceleration prohibited section.

As shown in FIG. 7, a piece of division line information extracted from road image data G4 obtained by shooting an area including a point P4 contains the division line (an uninterrupted continuous white line) on the left side of the travel path of the own vehicle and the division line (a white broken line (a white line interrupted at constant intervals)) on the right side of the travel path of the own vehicle. At that time, the own vehicle is highly likely to be present in a place where automatically stopping the vehicle is appropriate from the viewpoint of the ordinance or immediately before such a place. In this case, the CPU determines that the own vehicle is not in the deceleration prohibited section.

Figure 8A:
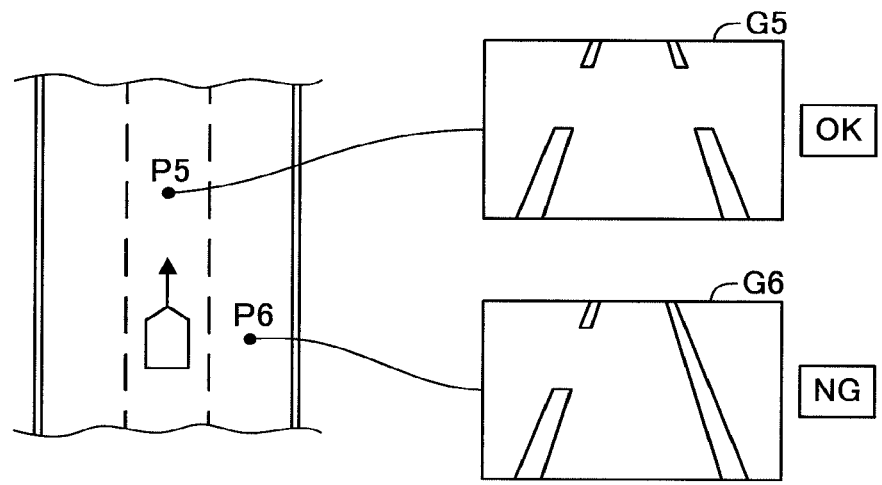
FIG. 8A is an illustration showing division line information extracted from the road image data output from the camera unit of the vehicle travelling on the road.

As shown in FIG. 8A, a piece of division line information extracted from road image data G5 obtained by shooting an area including a point P5 contains the division line (a white broken line) on the left side of the travel path of the own vehicle and the division line (a white broken line) on the right side of the travel path of the own vehicle. At that time, the own vehicle is highly likely to be present in a place where automatically stopping the vehicle is appropriate from the viewpoint of the ordinance or immediately before such a place. In this case, the CPU determines that the own vehicle is not in the deceleration prohibited section.

As shown in FIG. 8A, a piece of division line information extracted from road image data G6 obtained by shooting an area including a point P6 contains the division line (a white broken line) on the left side of the travel path of the own vehicle and the division line (an uninterrupted continuous white line) on the right side of the travel path of the own vehicle. At that time, the own vehicle is highly likely to be present in a place where automatically stopping the vehicle is inappropriate from the viewpoint of the ordinance (a passing lane) or immediately before such a place. In this case, the CPU determines that the own vehicle is in the deceleration prohibited section.

Figure 8B:
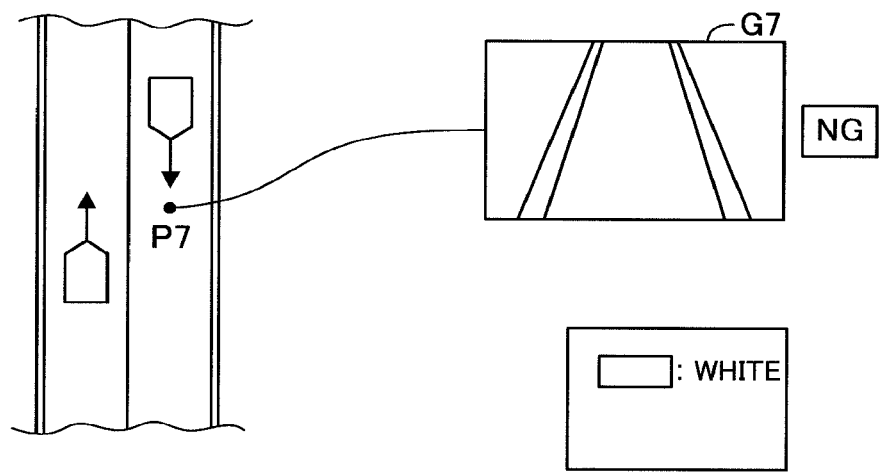
FIG. 8B is an illustration showing division line information extracted from the road image data output from the camera unit of the vehicle travelling on the road.

As shown in FIG. 8B, a piece of division line information extracted from road image data G7 obtained by shooting an area including a point P7 contains the division line (an uninterrupted continuous white line) on the left side of the travel path of the own vehicle and the division line (an uninterrupted continuous white line) on the right side of the travel path of the own vehicle. At that time, the own vehicle is highly likely to be present in a place where automatically stopping the vehicle is inappropriate from the viewpoint of the ordinance (a lane change prohibited road) or immediately before such a place. In this case, the CPU determines that the own vehicle is in the deceleration prohibited section.

Figure 9A:
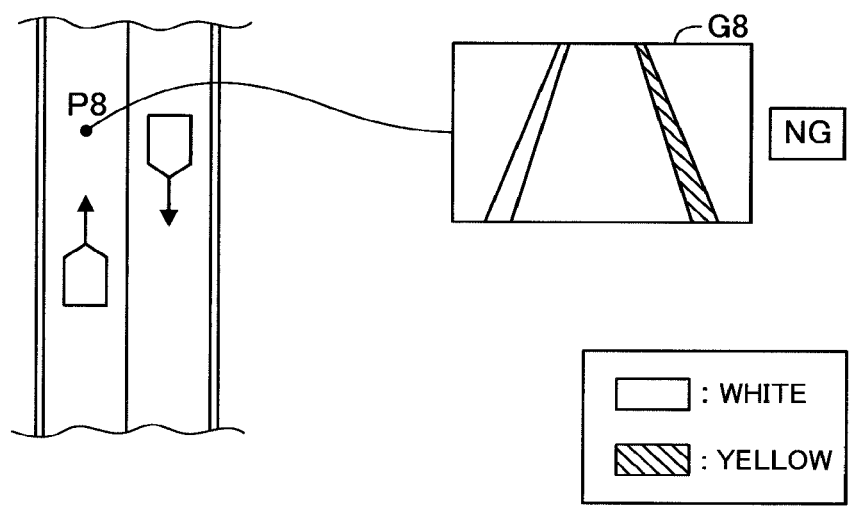
FIG. 9A is illustration showing division line information extracted from the road image data output from the camera unit of the vehicle travelling on the road.

As shown in FIG. 9A, a piece of division line information extracted from road image data G8 obtained by shooting an area including a point P8 contains the division line (an uninterrupted continuous white line) on the left side of the travel path of the own vehicle and the division line (a yellow line) on the right side of the travel path of the own vehicle. At that time, the own vehicle is highly likely to be present in a place where automatically stopping the vehicle is inappropriate from the viewpoint of the ordinance (a lane change prohibited road) or immediately before such a place. In this case, the CPU determines that the own vehicle is in the deceleration prohibited section.

Figure 9B:
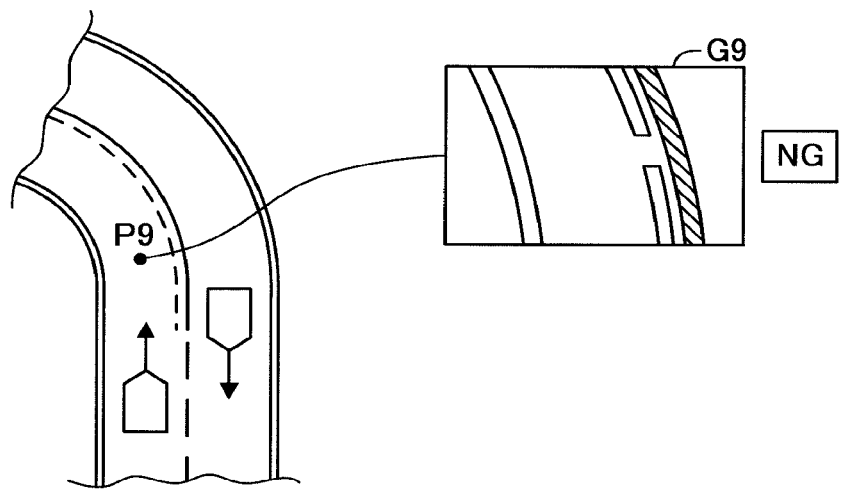
FIG. 9B is illustration showing division line information extracted from the road image data output from the camera unit of the vehicle travelling on the road.

As shown in FIG. 9B, a piece of division line information extracted from road image data G9 obtained by shooting an area including a point P9 contains the division line (an uninterrupted continuous white line) on the left side of the travel path of the own vehicle and the division line (a composite line including an uninterrupted continuous yellow line and a white line interrupted at constant intervals) on the right side of the travel path of the own vehicle. At that time, the own vehicle is highly likely to be present in a place where automatically stopping the vehicle is inappropriate from the viewpoint of the ordinance (a lane change prohibited road) or immediately before such a place. In this case, the CPU determines that the own vehicle is in the deceleration prohibited section.

Figure 10:
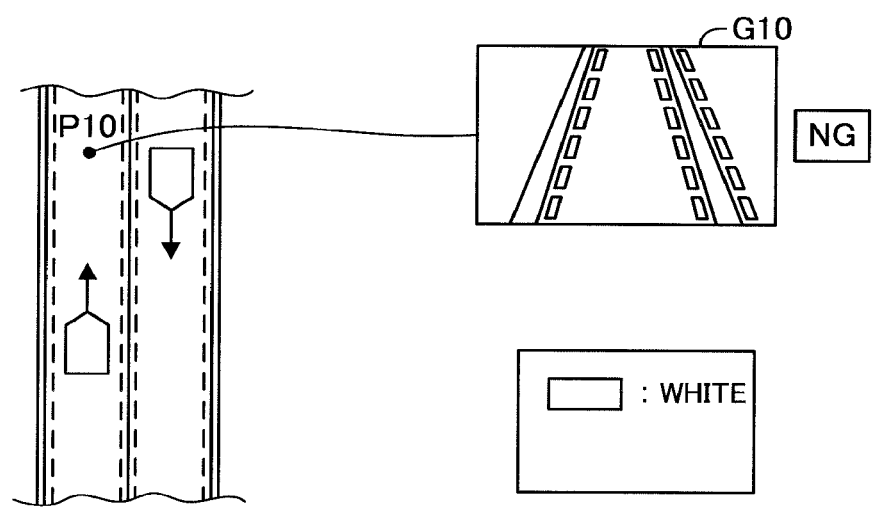
FIG. 10 is an illustration showing division line information extracted from the road image data output from the camera unit of the vehicle travelling on the road.

As shown in FIG. 10, a piece of division line information extracted from road image data G10 obtained by shooting an area including a point P10 contains the division line (a composite line including an uninterrupted continuous white line and a white line interrupted at constant intervals) on the left side of the travel path of the own vehicle and the division line (a composite line including an uninterrupted continuous white line and white lines interrupted at constant intervals) on the right side of the travel path of the own vehicle. At that time, the own vehicle is highly likely to be present in a place where automatically stopping the vehicle is inappropriate from the viewpoint of the ordinance (a place where careful driving is necessary) or immediately before such a place. In this case, the CPU determines that the own vehicle is in the deceleration prohibited section.

In the case where the own vehicle is determined to be in the deceleration prohibited section, the CPU makes a "Yes" determination in step 610 and proceeds to step 620 so as to set the value of the deceleration prohibition flag $X_{pro}$ to "1." Subsequently, the CPU proceeds to step 695 so as to end the current execution of the present routine. Notably, the CPU may set the value of the deceleration prohibition flag $X_{pro}$ to "1" except for the case where the own vehicle is determined "not to be in the deceleration prohibited section."

In contrast, in the case where the own vehicle is not determined to be in the deceleration prohibited section (including the case where the own vehicle is determined not to be in the deceleration prohibited section), the CPU makes a "No" determination in step 610 and proceeds to step 630 so as to set the value of the deceleration prohibition flag $X_{pro}$ to "0." Subsequently, the CPU proceeds to step 695 so as to end the current execution of the present routine.

According to the vehicle travel control apparatus according to the embodiment of the present invention, an effect which will be described below can be attained. Namely, in the case of the conventional apparatus, the place in which the vehicle is automatically stopped is not specifically determined. Therefore, the conventional apparatus may cause the auto-stopping vehicle to stop or travel at low speed in a place where the ordinance prohibits parking or stopping of vehicles, or a place where the ordinance prohibits lane changes in the lane in which the auto-stopping vehicle is travelling and therefore if the auto-stopping vehicle actually stops or travels at low speed, the auto-stopping vehicle hinders smooth traffic of other vehicles.

In contrast, the vehicle travel control apparatus according to the embodiment of the present invention prohibits declaration of the vehicle at the above-described places where automatically stopping the vehicle is inappropriate and immediately before the places. Thus, the vehicle travel control apparatus can decrease the possibility that the vehicle is stopped or is caused to travel at low speed in the above-described places where automatically stopping the vehicle is inappropriate.

<Modifications>

Although the embodiment of the present invention has been described, the present invention is not limited to the above-described embodiment, and various modifications based on the technical idea of the present invention are possible.

In the present embodiment, the determination as to whether or not the own vehicle is in the places where automatically stopping the vehicle is inappropriate from the viewpoint of the ordinance may be performed through use of road information regarding the travel path of the own vehicle obtained from the navigation apparatus. The road information may be information which directly shows stoppage prohibited places such as intersections, railroad crossings, lane change prohibited points, merging points, T-intersections, and passing lanes. In this case, the CPU of the driving support ECU 10 sets the value of the deceleration prohibition flag $X_{pro}$ to "1" when the CPU determines, from the road information, that the own vehicle is in one of the deceleration prohibited sections (namely, the stoppage prohibited places or places immediately before the stoppage prohibited places) determined on the basis of the places where automatically stopping the vehicle is inappropriate from the viewpoint of the ordinance (stoppage prohibited places). Further, the road information may be information (representing the types, etc., of division lines) equivalent to the division line information obtained by the camera unit. In this case, the CPU of the driving support ECU 10 determines whether or not the own vehicle is in the deceleration prohibited section through use of the information equivalent to the division line information. In the case where the own vehicle is determined to be in the deceleration prohibited section, the CPU sets the value of the deceleration prohibition flag $X_{pro}$ to "1."

In the present embodiment, a stereo camera is used as the camera unit 17. However, a monocular camera or the like may be used.

In the present embodiment, the places where automatically stopping the vehicle is inappropriate from the viewpoint of the ordinance are not limited to the places specifically described above.

In the present embodiment, the determination as to whether or not the driver is in the anomalous state is performed on the basis of the time over which the no-driving-operation state continues. However, instead, the determination as to whether or not the driver is in the anomalous state may be performed through use of a so-called "driver monitoring technique" disclosed in, for example, Japanese Patent Application Laid-Open (kokai) No. 2013-152700. More specifically, a camera for shooting (photographing) the driver is provided on a member (e.g., a steering wheel, a pillar, or the like) within a vehicle compartment, and the driving support ECU 10 monitors the direction in which the driver is looking or the direction of the face of the driver through use of the image shot by the camera. The driving support ECU 10 determines that the driver is in the provisional anomalous state in the case where, for the provisional anomaly deciding time $t1_{ref}$ or longer, the driver is continuously looking, or the driver's face continuously faces, toward a direction toward which the driver is not looking or the driver's face does not face over a long period of time during ordinary driving of the vehicle. Further, the driving support ECU 10 determines that the driver is in the final anomalous state when such a state continues for the final anomaly deciding time $t2_{ref}$ or longer after the provisional anomaly determination was performed.

The determination as to whether or not the driver is in the anomalous state may be performed through use of the confirmation button 20. More specifically, every time a first time elapses, the driving support ECU 10 displays a prompting message and/or generates a prompting voice sound so as to prompt the driver to operate the confirmation button 20. When a state in which the confirmation button 20 is not operated continues at least for the provisional anomaly deciding time $t1_{ref}$ which is longer than the first time, the CPU determines that the driver is in the provisional anomalous state. Further, after having made the provisional anomaly determination, every time the first time elapses, the driving support ECU 10 displays a prompting message and/or generates a prompting voice sound so as to prompt the driver to operate the confirmation button 20. When a state in which the confirmation button 20 is not operated continues at least for the final anomaly deciding time $t2_{ref}$ which is longer than the first time, the CPU determines that the driver is in the final anomalous state.

Such anomaly determination using the shot image or the confirmation button 20 can be utilized for determining whether or not the driver is in the state in which the driver performs no driving operation (at least one of step 230 and step 320).

Figure 2:
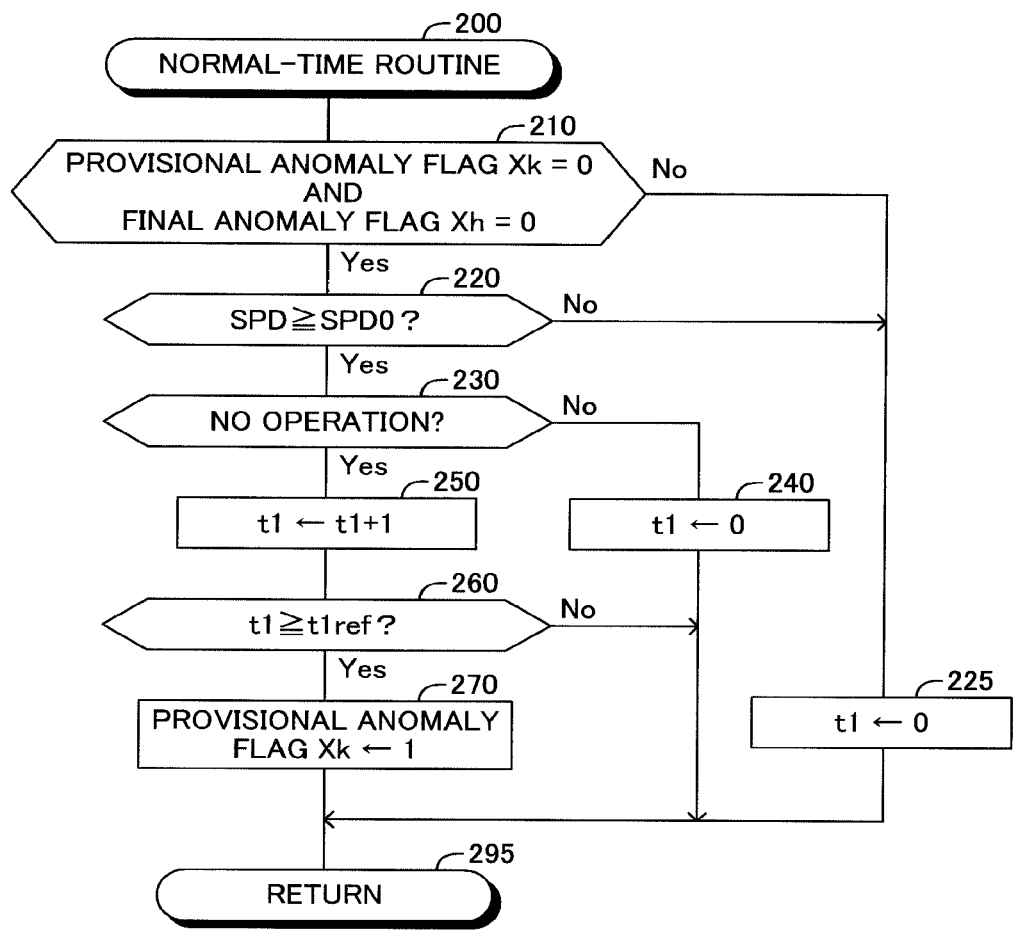
FIG. 2 is a flowchart representing a normal-time routine executed by a CPU of a driving support ECU shown in FIG. 1.

Further, in the normal-time routine shown in FIG. 2, execution of the provisional anomaly determination may be permitted when LKA is being performed, or execution of the provisional anomaly determination may be permitted when LKA and ACC are being performed. Namely, the normal-time routine may be modified as follows. A step for determining "whether or not LKA is being performed" or for determining "whether or not LKA and ACC are being performed" may be added between step 200 and step 210. When the CPU makes a "Yes" determination in the added step, the CPU proceeds to step 210. Meanwhile, when the CPU makes a "No" determination in the added step, the CPU proceeds to step 225.

What is claimed is:

1. A vehicle travel control apparatus applied to a vehicle, comprising:
at least one electronic control unit configured to:
determine, through monitoring, whether or not a driver of the vehicle is in an anomalous state in which the driver has lost his or her ability to drive the vehicle;
automatically stop the vehicle by decelerating the vehicle after a final anomaly determined time which is a point in time when it is determined that the driver is in the anomalous state;
determine whether or not the vehicle is present in a deceleration prohibited section, determined on the basis of places where automatically stopping the vehicle is inappropriate from a viewpoint of an ordinance, through use of at least either of
division line information regarding division lines on left and right sides of a travel path of the vehicle recognized from road image data from an image capturing apparatus when the vehicle includes the image capturing apparatus, and
road information regarding the travel path of the vehicle obtained from a navigation apparatus when the vehicle includes the navigation apparatus;
not decelerate the vehicle in a case where it is determined that the vehicle is present in the deceleration prohibited section after the final anomaly determined time;
start deceleration of the vehicle from a provisional anomaly determined time which is a point in time which is before the final anomaly determined time and at which it is determined that the driver is highly likely to be in the anomalous state; and not decelerate the vehicle in a case where it is determined that the vehicle is present in the deceleration prohibited section after the provisional anomaly determined time.

2. The vehicle travel control apparatus according to claim 1, wherein the at least one electronic control unit is configured to:
   determine whether or not the vehicle is present in the deceleration prohibited section through use of the division line information; and
   determine that the vehicle is present in the deceleration prohibited section when the division line information contains none of the division lines on the left and right sides of the travel path or when both the division lines on the left and right sides of the travel path contained in the division line information end ahead of the vehicle.

3. The vehicle travel control apparatus according to claim 1, wherein the at least one electronic control unit is configured to:
   determine whether or not the vehicle is present in the deceleration prohibited section through use of the division line information; and
   determine that the vehicle is present in the deceleration prohibited section when an uninterrupted continuous yellow line is contained in the division lines contained in the division line information.

4. The vehicle travel control apparatus according to claim 1, wherein the at least one electronic control unit is configured to:
   determine whether or not the vehicle is present in the deceleration prohibited section through use of the division line information; and
   determine that the vehicle is present in the deceleration prohibited section when each of the division lines on the left and right sides of the travel path contained in the division line information is an uninterrupted continuous white line.

5. The vehicle travel control apparatus according to claim 1, wherein the at least one electronic control unit is configured to:
   determine whether or not the vehicle is present in the deceleration prohibited section through use of the division line information; and
   determine that the vehicle is present in the deceleration prohibited section when the division line information contains only one of the division lines on the left and right sides of the travel path of the vehicle.

6. The vehicle travel control apparatus according to claim 1, wherein the at least one electronic control unit is configured to:
   determine whether or not the vehicle is present in the deceleration prohibited section through use of the division line information; and
   determine that the vehicle is present in the deceleration prohibited section when each of the division lines on the left and right sides of the travel path contained in the division line information is a composite line including an uninterrupted continuous white line and a white line interrupted at constant intervals.

7. The vehicle travel control apparatus according to claim 1, wherein the at least one electronic control unit is configured to:
   determine whether or not the vehicle is present in the deceleration prohibited section through use of the division line information; and
   in the case where the vehicle is travelling on a road within a country which has an ordinance which requires the vehicle to keep to the left, determine that the vehicle is present in the deceleration prohibited section when the left side division line contained in the division line information is a white line interrupted at constant intervals and the right side division line contained in the division line information is an uninterrupted continuous white line.

8. The vehicle travel control apparatus according to claim 1, wherein the at least one electronic control unit is configured to:
   determine whether or not the vehicle is present in the deceleration prohibited section through use of the division line information; and
   in the case where the vehicle is travelling on a road within a country which has an ordinance which requires the vehicle to keep to the right, determine that the vehicle is present in the deceleration prohibited section when the right side division line contained in the division line information is a white line interrupted at constant intervals and the left side division line contained in the division line information is an uninterrupted continuous white line.

9. The vehicle travel control apparatus according to claim 1, wherein the at least one electronic control unit is configured to:
   determine whether or not the vehicle is present in the deceleration prohibited section through use of the road information; and
   determine that the vehicle is present in the deceleration prohibited section when the road information shows that a place of the vehicle is at least one of an intersection, a railroad crossing, a lane change prohibited point, a merging point, a T-intersection, a place where an indication installed on the basis of an installation guideline of a governmental organization calls drivers' attention to a state of roads or characteristics of traffic and in which careful driving is necessary, and a passing lane.

10. The vehicle travel control apparatus according to claim 1, wherein, in order to not decelerate the vehicle in the case where it is determined that the vehicle is present in the deceleration prohibited section, the at least one electronic control unit is configured to maintain a speed of the vehicle.

11. The vehicle travel control apparatus according to claim 1, wherein, in order to not decelerate the vehicle in the case where it is determined that the vehicle is present in the deceleration prohibited section after the final anomaly determined time, the at least one electronic control unit is configured to maintain a speed of the vehicle.

12. The vehicle travel control apparatus according to claim 1, wherein, in order to not decelerate the vehicle in the case where it is determined that the vehicle is present in the deceleration prohibited section after the provisional anomaly determined time, the at least one electronic control unit is configured to maintain a speed of the vehicle.

13. The vehicle travel control apparatus according to claim 1, wherein
   in order to not decelerate the vehicle in the case where it is determined that the vehicle is present in the deceleration prohibited section after the final anomaly determined time, the at least one electronic control unit is configured to maintain a speed of the vehicle, and
   in order to not decelerate the vehicle in the case where it is determined that the vehicle is present in the deceleration prohibited section after the provisional anomaly determined time, the at least one electronic control unit is configured to maintain a speed of the vehicle.

* * * * *